United States Patent
Boland et al.

(10) Patent No.: US 7,460,858 B2
(45) Date of Patent: Dec. 2, 2008

(54) SYSTEM FOR REDUCING PAGING CHANNEL OCCUPANCY FOR MESSAGE WAITING INDICATION IN MOBILE SWITCHING CENTERS

(75) Inventors: Richard Robert Boland, LaGrange, IL (US); Mark Alan McCormick, Naperville, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 119 days.

(21) Appl. No.: 11/030,215

(22) Filed: Jan. 5, 2005

(65) Prior Publication Data

US 2005/0181767 A1 Aug. 18, 2005

Related U.S. Application Data

(63) Continuation-in-part of application No. 10/610,174, filed on Jun. 30, 2003.

(51) Int. Cl.
H04Q 7/22 (2006.01)
(52) U.S. Cl. .............. 455/412.2; 455/412.1; 455/413; 455/433; 455/458
(58) Field of Classification Search .............. 455/412.1, 455/412.2, 458
See application file for complete search history.

(56) References Cited

U.S. PATENT DOCUMENTS

| | | | | |
|---|---|---|---|---|
| 5,369,681 A | * | 11/1994 | Boudreau et al. | 455/456.1 |
| 5,875,400 A | * | 2/1999 | Madhavapeddy et al. | 455/458 |
| 6,035,203 A | * | 3/2000 | Hanson | 455/458 |
| 6,178,322 B1 | * | 1/2001 | Creech | 455/412.2 |
| 6,330,436 B1 | * | 12/2001 | Zidel | 455/412.2 |
| 6,462,646 B2 | * | 10/2002 | Helferich | 340/7.21 |
| 7,035,382 B1 | * | 4/2006 | Shin et al. | 379/88.12 |
| 2001/0029181 A1 | * | 10/2001 | Verkama | 455/426 |
| 2003/0027572 A1 | * | 2/2003 | Karlsson et al. | 455/433 |
| 2005/0009534 A1 | * | 1/2005 | Harris et al. | 455/453 |

* cited by examiner

Primary Examiner—Vincent P. Harper
Assistant Examiner—Mazda Sabouri

(57) ABSTRACT

In order to reduce the traffic on the paging channel, the system for reducing paging channel occupancy for message waiting indication in mobile switching centers allows the Message Waiting Notification process to determine a last zone in which the Mobile Subscriber was located and only transmit the Message Waiting Indication to the cells within that zone. This eliminates message transmission on the paging channel of cells which are not likely to have the Mobile Subscriber Station residing in their service area. Multiple retries can be attempted and if the last retry is being activated, the paging can be extended to cover all zones in the Mobile Switching Center. The sharing of information about when a mobile has responded to a message waiting count between the Serving MSC and the Home MSC also reduces the paging channel occupancy. The method of not sending a message waiting notification when a mobile has already acknowledged the message count greatly reduces the impact of Message Waiting Notification on the paging channel occupancy. In particular, border cell areas where the Mobile Subscriber Station can bounce between MSCs is where the biggest benefit can be derived.

18 Claims, 10 Drawing Sheets

SYSTEM FOR REDUCING PAGING CHANNEL OCCUPANCY FOR MESSAGE WAITING INDICATION IN MOBILE SWITCHING CENTERS

CROSS-REFERENCE TO RELATED APPLICATIONS

This application is a continuation-in-part of U.S. patent application Ser. No. 10/610,174, filed Jun. 30, 2003 and titled "System For Providing Message Waiting Indication Updates In A Cellular Communication Network".

FIELD OF THE INVENTION

This invention relates to cellular communication networks and in particular to a system that provides message waiting notification update messages to Mobile Subscriber Stations that roam among a number of Mobile Switching Centers within the cellular communication network.

PROBLEM

It is a problem in cellular communication networks to efficiently utilize the paging channel, also known as the forward control channel. The paging channel is a critical resource, which is used for a multitude of purposes, including call origination, call delivery, and the delivery of message waiting indications to the Mobile Subscriber Station. The number of calls that a Mobile Switching Center can handle is determined by the capacity and the present occupancy of the paging channel. Therefore, any reduction in the use of the paging channel results in a significant performance improvement for the Mobile Switching Center.

In order to reduce the effective occupancy of the paging channel, Mobile Switching Centers divide their coverage area into a plurality of zones, each of which contains a plurality of cells. As the Mobile Subscriber Station moves from one zone to another in the Mobile Switching Center, it accesses the Mobile Switching Center via an autonomous registration process which indicates to the Mobile Switching Center that the Mobile Subscriber Station has moved to a different zone. This process limits the number of cells to which call delivery pages are transmitted and thereby the traffic on the paging channel for the remaining cells in the Mobile Switching Center.

However, while the use of zones provides an improvement in the utilization of the paging channel, the use of this channel for message waiting indications has a far more significant impact on the Mobile Switching Center. In cellular communication networks, a Mobile Subscriber subscribes to have calls delivered to their Mobile Subscriber Station. In addition, the Mobile Subscriber can receive additional features, including Calling Party Number Identification (Caller-ID), Call Forwarding, and Voice Mail. For example, the Mobile Subscriber may not be available to answer an incoming call or may decide not to answer an incoming call based on the Caller ID. In this situation, the calling party is redirected to a Voice Mail system, which stores messages for the Mobile Subscriber, as input by the calling parties. Each time a calling party leaves a message in the Voice Mail system, data that identifies the number of messages residing in the Voice Mail system is updated and the Voice Mail system creates an incall message or other signaling message containing data that notes the number of messages waiting for retrieval for the Mobile Subscriber. This data is transmitted to the Mobile Subscriber's Home System, which then attempts to deliver a notification to the Mobile Subscriber listing the number of messages waiting for retrieval for the Mobile Subscriber. This notification is delivered by the Mobile Switching Center broadcasting a Message Waiting Notification in a signaling message to the Mobile Subscriber over all paging channels in the Mobile Switching Center. All of the paging channels of all of the cells in the Mobile Switching Center carry this notification, even though the Mobile Subscriber Station is presently served by only one of these cells. These Message Waiting indication messages are twice the size of call delivery pages and run at a higher priority, resulting in incoming calls being dropped when the message waiting indication traffic overloads the paging channel.

A further problem with the present Message Waiting Notification service in cellular communication networks is that it is difficult to efficiently utilize the network resources when the Mobile Subscriber Station roams among various call coverage areas. In particular, when a Mobile Subscriber Station registers with a visited (serving) Mobile Switching Center, the subscriber's Home Location Register (HLR) transmits information to the serving Mobile Switching Center indicative of the number of messages waiting for retrieval by the subscriber at the Mobile Subscriber Station. The serving Mobile Switching Center uses the forward control (paging) channel to transmit this message waiting data to the Mobile Subscriber Station. The Mobile Subscriber Station acknowledges receipt of the message received on the forward control channel and the presence of the unread message waiting information. The Visited Location Register in the serving Mobile Switching Center is updated to indicate that the Mobile Subscriber Station has been notified about the presence of unread messages.

When the Mobile Subscriber Station roams to the call coverage area of another Mobile Switching Center and performs either an autonomous registration or a call origination/termination, the new serving Mobile Switching Center accesses the subscriber's Home Location Register to obtain subscriber information to authorize the provision of service to this subscriber. As part of this process, the subscriber's Home Location Register again transmits the message waiting information, indicative of the number of messages waiting for retrieval by the subscriber at the Mobile Subscriber Station, to the new serving Mobile Switching Center. The new serving Mobile Switching Center is unaware of the previous message exchange noted above and uses the forward control (paging) channel to again transmit this data to the Mobile Subscriber Station. The Mobile Subscriber Station acknowledges receipt of the message received on the forward control channel and the presence of the unread message waiting information. The Visited Location Register in the new serving Mobile Switching Center is updated to indicate that the Mobile Subscriber Station has been notified about the presence of unread messages.

This process can continue seriatim as the subscriber roams through various call coverage areas, since each Mobile Switching Center is unaware of the acknowledgement transmitted by the Mobile Subscriber Station to the original Mobile Switching Center and any other previously contacted Mobile Switching Centers. In a highly congested cellular communication network or a cellular communication network with many border cells, the number of forward control channel message transmissions becomes excessive and serves to congest the forward control channel with unnecessary messages. Ultimately, the forward control channel congestion can result in the loss of new call originations and call deliveries.

SOLUTION

The above-described problems are solved and a technical advance achieved by the present system for reducing paging channel occupancy for message waiting indication in mobile switching centers (termed "message waiting indication system" herein). In order to alleviate the traffic on the paging channel, the present message waiting indication system allows the Message Waiting Notification process to determine a last zone in which the Mobile Subscriber was located and only transmit the Message Waiting Indication to the cells within that zone. This eliminates message transmission on the paging channel of cells which are not likely to have the Mobile Subscriber Station residing in their service area. Multiple retries can be attempted and if the last retry is being activated, the paging can be extended to cover all zones in the Mobile Switching Center.

Many Mobile Switching Centers are divided into paging or registration zones, which are areas where multiple cells are located and which broadcast similar information to the mobile. These zones provide a mechanism to limit a page for an incoming call to a subset of the Mobile Switching Center. The paging/registration zone identification is stored in memory for each of the mobiles and is used for paging messages to alert the Mobile Subscriber Station of the presence of an incoming call. The existing process which updates the HLR and/or the VLR with new message waiting counts broadcasts this information over every paging channel in a Mobile Switching Center to the Mobile Subscriber. The present message waiting indication system used the paging/registration zone data that is stored for each Mobile Subscriber Station in combination with the message waiting count update to reduce the traffic on the paging channel across an entire Mobile Switching Center by directing the message waiting indication messages to only the paging channels where it is most likely to locate the Mobile Subscriber Station.

The present message waiting indication system is described herein in conjunction with the message waiting indication update feature described in U.S. patent application Ser. No. 10/610,174. However, the present message waiting indication system is not limited to this application and can be used in any cellular communication network configuration; the present description provides a framework to simplify the comprehension of the present message waiting indication system. The above-noted patent application describes a system which comprises a number of processes that execute in the various Mobile Switching Centers of the cellular communication network and functions to use the Inter-System Page (ISPAGE) message to enable the exchange of message waiting indication information between the Home Location Register, the serving Mobile Switching Center and the Mobile Subscriber wireless communication devices served by the Mobile Switching Centers. In particular, the serving Mobile Switching Center, upon receipt of a message waiting acknowledgement from the Mobile Subscriber wireless communication device, updates the local copy of the Subscriber's data in the Visited Location Register and forwards this information to the Subscriber's Home Location Register via a message, such as an ANSI-41 Registration Notification Invoke, with the qualification information code being set to NO INFO (or Registration Cancellation return result) and the number of the messages in the message waiting queue being acknowledged. The Home Location Register stores this received data in the Subscriber's Home Location Register entry for use when the next successive Registration Notification Invoke is received from a new serving Mobile Switching Center or in response to the Subscriber initiating a local access.

When the serving Mobile Switching Center receives a Registration Notification Invoke message from the Subscriber's Home Location Register to update the Subscriber's information and the message waiting indication count is the same as the count previously sent to the Home Location Register, the serving Mobile Switching Center does not have to transmit a message waiting indication over the forward control channel to the Mobile Subscriber wireless communication device, thus reducing the message traffic on the forward control channel.

When a Mobile Subscriber's wireless communication device registers with a Mobile Switching Center in the cellular communication network, the Mobile Subscriber may have messages queued in their voice messaging system. When this occurs, the serving Mobile Switching Center provides data to the Mobile Subscriber's wireless communication device via the radio frequency communication link to indicate the number of messages waiting for the Mobile Subscriber. However, the Mobile Subscriber may not receive this information because in the interim they have roamed into the coverage area of another Mobile Switching Center, where a base station subsystem served by that Mobile Switching Center has the strongest signal. The Mobile Subscriber's wireless communication device may be locking on to this signal or have already locked on to this signal. There is, therefore, a need to forward the message waiting indication data to Mobile Switching Centers whose service areas overlap with the service area of the Mobile Switching Center presently serving this Mobile Subscriber's wireless communication device. In this manner, any one of these Mobile Switching Centers can update the Mobile Subscriber with regard to message waiting indications, even though that updating Mobile Switching Center does not presently handle the communication connection with the Mobile Subscriber's wireless communication device.

DETAILED DESCRIPTION

Figure 1:
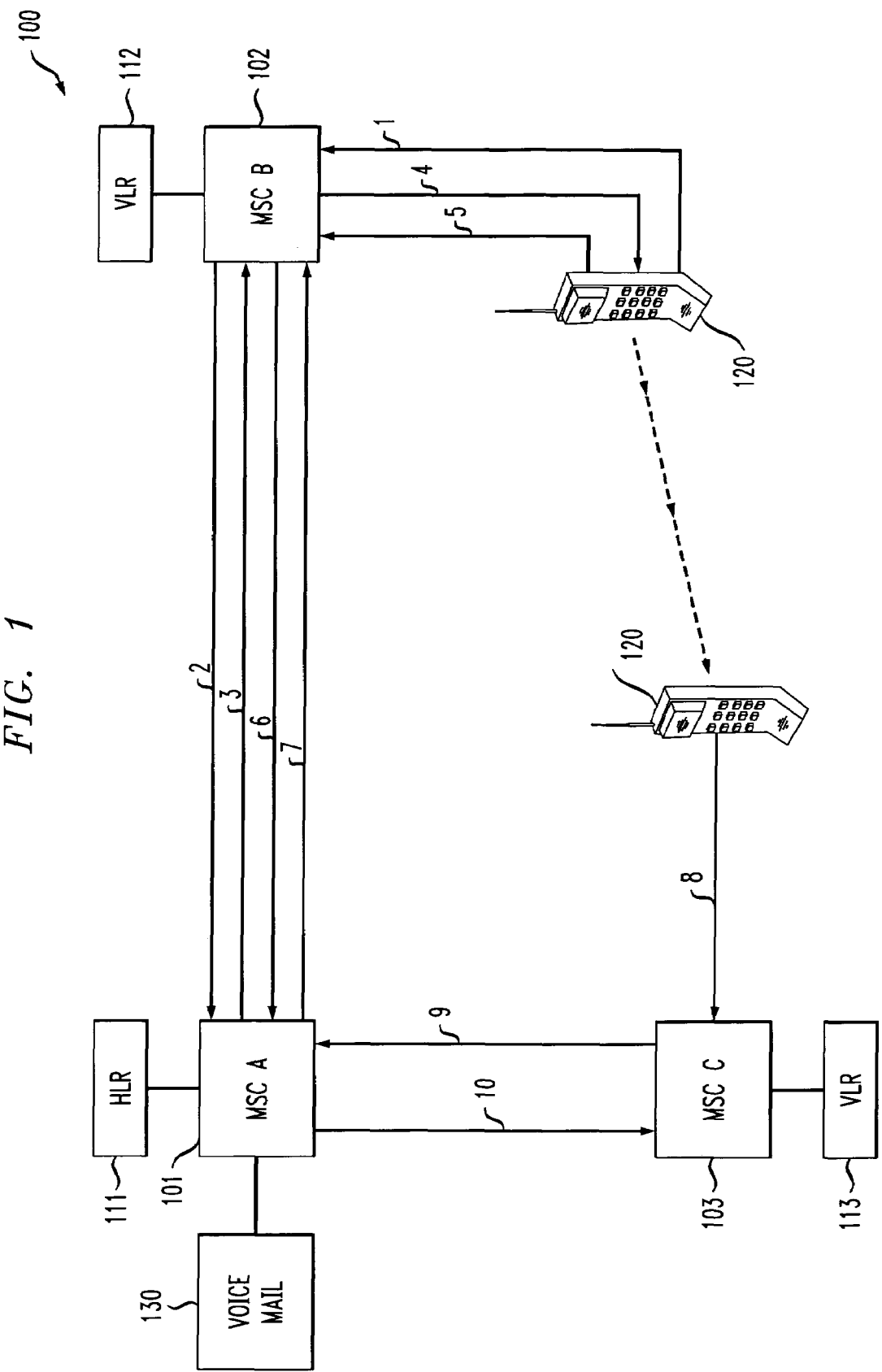
FIG. 1 illustrates in block diagram form the present message waiting indication system and a typical environment in which it operates, including the exchange of messages among the various elements in the cellular communication network.

FIG. 1 illustrates in block diagram form the present message waiting indication system and a typical environment in which it operates, including the exchange of messages among the various elements in the cellular communication network. A cellular communication network 100 consists of a plurality of Mobile Switching Centers 101-103, each of which serves one or more base station subsystems (not shown) that provide the radio frequency links to the plurality of Mobile Subscriber Stations 120 that are operational in each call coverage area (termed cell) (not shown) provided by the associated base station subsystem. One Mobile Switching Center 101 is typically termed the Subscriber's Home Mobile Switching Center and it maintains the subscriber's identification, authentication, and call services definition data in an associated Home Location Register 111. Other Mobile Switching Centers 102, 103 maintain their own Home Location Registers (not shown) and Visited Location Registers 112, 113 to store call authorization data for subscribers who roam out of their home service area to the call coverage area of the visited Mobile Switching Centers 102, 103. Alternatively, the Home Location Register could be a Standalone Home Location Register (SHLR), thus not part of a Mobile Switching Center.

Initial Roaming Mobile Subscriber Station Registration with Notification

Figure 2A:
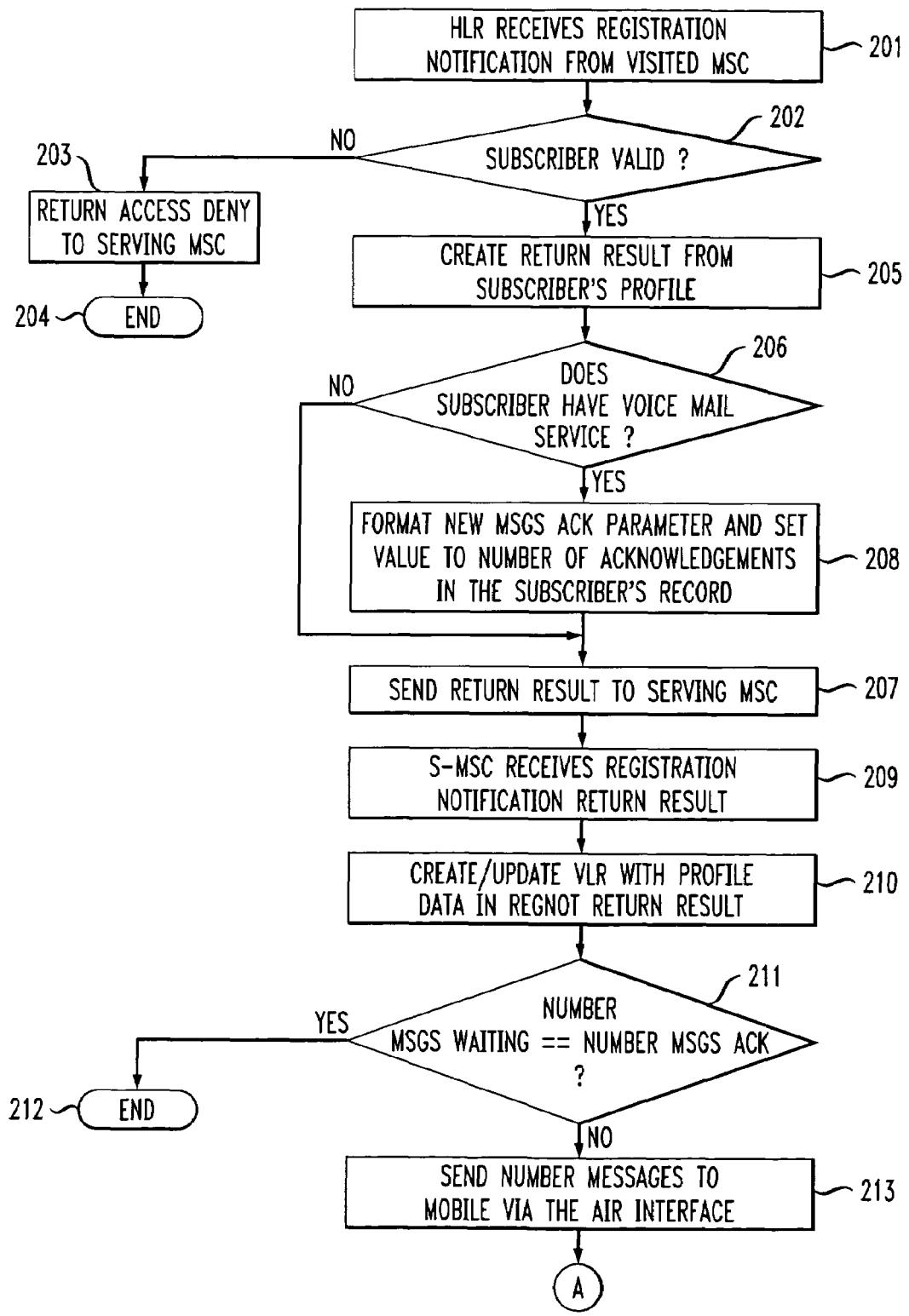
FIGS. 2A and 2B illustrate in flow diagram form the operation of the message waiting notification update system to provide message waiting notification during an initial Mobile Subscriber Station registration.
Figure 2B:
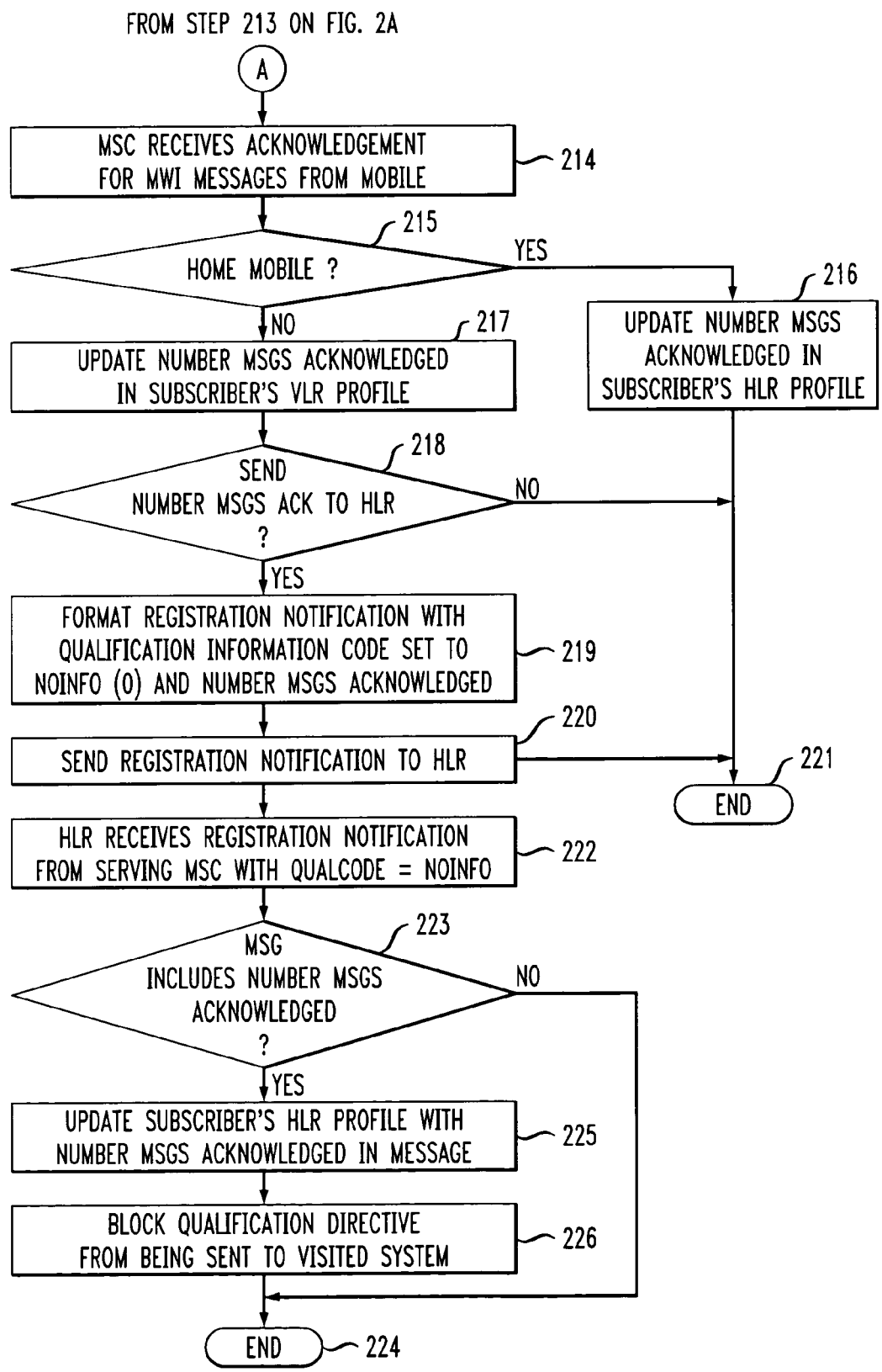

As illustrated in flow diagram form in FIG. 2, in the cellular communication network 100, when a Mobile Subscriber Station 120 registers with a visited (serving) Mobile Switching Center 102 by transmitting a service request and the MIN/ESN of the Mobile Subscriber Station 120 to the serving Mobile Switching Center 102 via path 1, the serving Mobile Switching Center 102 must validate the subscriber's authorization to receive service. This is accomplished at step 201 by transmitting a Registration Notification message to the subscriber's home Mobile Switching Center 101 over path 2 to retrieve data from the subscriber's Home Location Register (HLR) 111. The subscriber's Home Location Register (HLR) 111 at step 202 determines whether the identified Mobile Subscriber Station 120 is a valid subscriber and if not, returns an Access Deny message to the serving Mobile Switching Center 102 at step 203 via path 3, the service request from Mobile Subscriber Station 120 is denied, and the process ends at step 204.

If the identified Mobile Subscriber Station 120 is a valid subscriber, the Home Location Register (HLR) 111 creates a Registration Notification Return Result message that contains the necessary subscriber service authorization data at step 205 and determines at step 206 whether the subscriber has voice mail service. If the subscriber does not have voice mail service, processing advances to step 207, as described below. If the subscriber does have voice mail service, at step 208 the Home Location Register 111 retrieves data from its memory indicative of the number of unread messages that are stored in memory for the subscriber and also formats a new MSGS ACK parameter and sets the value to the number of these unread messages that have been previously acknowledged by the Mobile Subscriber Station 120. For the purpose of this example, assume that new messages have arrived for the subscriber and no notification has previously been transmitted to the Mobile Subscriber Station 120 to alert the subscriber of the presence of these unread messages. Then, at step 207 the Home Location Register 111 inserts this data into the previously generated Registration Notification Return Result message and transmits this message over path 3 to the serving Mobile Switching Center 102 indicative of the number of messages waiting for retrieval by the subscriber at the Mobile Subscriber Station 120. The serving Mobile Switching Center 102 receives the Registration Notification Return Result message at step 209 and at step 210 creates or updates the Visited Location Register 112 with the subscriber profile data contained in the Registration Notification Return Result message and processes the service request for the Mobile Subscriber Station 120 in well known fashion. At step 211, the serving Mobile Switching Center 102 compares the message waiting information contained in the Registration Notification Return Result message with the message waiting data stored in the Visited Location Register 112 for this subscriber. Processing ends at step 212 if the number of unread messages and acknowledgements identified by the subscriber's Home Location Register 111 matches the data stored in the Visited Location Register 112 for the number of unread messages acknowledged by the Mobile Subscriber Station 120. If the serving Mobile Switching Center 102 determines the presence of unacknowledged unread messages, then at step 213 the serving Mobile Switching Center 102 uses the forward control (paging) channel of the radio link (path 4) to the Mobile Subscriber Station 120 to transmit this message waiting data to the Mobile Subscriber Station 120. The Mobile Subscriber Station 120 at step 214 acknowledges receipt of the message received on the forward control channel via path 5 and the presence of the unread message waiting information.

If the serving Mobile Switching Center is the subscriber's home location as determined at step 215, then at step 216, the subscriber's Home Location Register is updated to reflect the new number of unread messages acknowledged and processing ends at step 221. In the present case, the subscriber is roaming and at step 217 the Visited Location Register 112 in the serving Mobile Switching Center 102 is updated to indicate that the Mobile Subscriber Station 120 has been notified about the presence of unread messages. At step 218, the serving Mobile Switching Center 102 determines whether the message acknowledgement data should be updated in the subscriber's Home Location Register 111. If no update is necessary, processing exits at step 221. If an update is required, at step 219 the serving Mobile Switching Center 102 generates a Registration Notification Invoke message with the qualification information code contained therein set to NOINFO(0) and containing data indicative of the number of messages acknowledged by the Mobile Subscriber Station 120. At step 220, the serving Mobile Switching Center 102 transmits this message over path 6 to the subscriber's Home Location Register 111 via the subscriber's home Mobile Switching Center 101. The serving Mobile Switching Center 102 then terminates processing at step 221.

The subscriber's Home Location Register 111 receives the Registration Notification message at step 222 and at step 223 determines whether the message contains data indicative of the number of unread messages acknowledged by the Mobile Subscriber Station 120. If this data is not contained in this message, processing exits at step 224; otherwise, at step 225, the subscriber's Home Location Register 111 updates the subscriber's profile to reflect the new number of unread messages acknowledged by the Mobile Subscriber Station 120. The subscriber's Home Location Register 111 then blocks the Qualification Directive message (as described below) from being transmitted to the serving Mobile Switching Center 102 and processing exits at step 224.

Thus, the message waiting notification update system maintains an accurate count of the number of unread messages waiting for a subscriber and the number of unread messages acknowledged by the Mobile Subscriber Station. The serving Mobile Switching Center, upon receipt of a message waiting acknowledgement from the Mobile Subscriber Station, updates the local copy of the subscriber's data in the Visited Location Register and forwards this information to the subscriber's Home Location Register where this received data is stored in the subscriber's Home Location Register entry for use when the next successive Registration Notification is received from a new serving Mobile Switching Center or in response to the subscriber initiating a local access.

Subsequent Roaming Mobile Subscriber Station Registrations Notification

In the case where the Mobile Subscriber Station 120 roams to a new Mobile Switching Center 103, as illustrated by the dotted line in FIG. 1, the Mobile Subscriber Station registration process is initiated at the new Mobile Switching Center 103 over path 8 and this becomes the serving Mobile Switching Center 103. The registration process triggers the registration cancellation process described later. The registration process is implemented as described above over paths 8 and 9 and the unread message and message acknowledgement data from the subscriber's profile in the Home Location Register 111 is written into a new entry in the Visited Location Register 113. For the purpose of this description, assume that the subscriber has not read the unread messages described above. If no new messages have arrived for the subscriber since the previous registration, then at step 211 the number of messages previously acknowledged matches the number of unread messages queued for the subscriber and the message waiting notification process exits at step 212. If new messages have arrived for the subscriber since the previous registration, then at step 214 data indicative of the updated number of unread messages is transmitted to the Mobile Subscriber Station 120 and processing proceeds as described above.

Thus, the new registration process does not result in use of the forward control (paging) channel of the radio link to the Mobile Subscriber Station 120 to transmit message waiting data indication to the Mobile Subscriber Station 120, unless a data update is required. The serving Mobile Switching Center does not have to transmit a message waiting notification over the forward control channel to the Mobile Subscriber Station, thereby conserving this resource.

Qualification Directive Notification

Figure 3A:
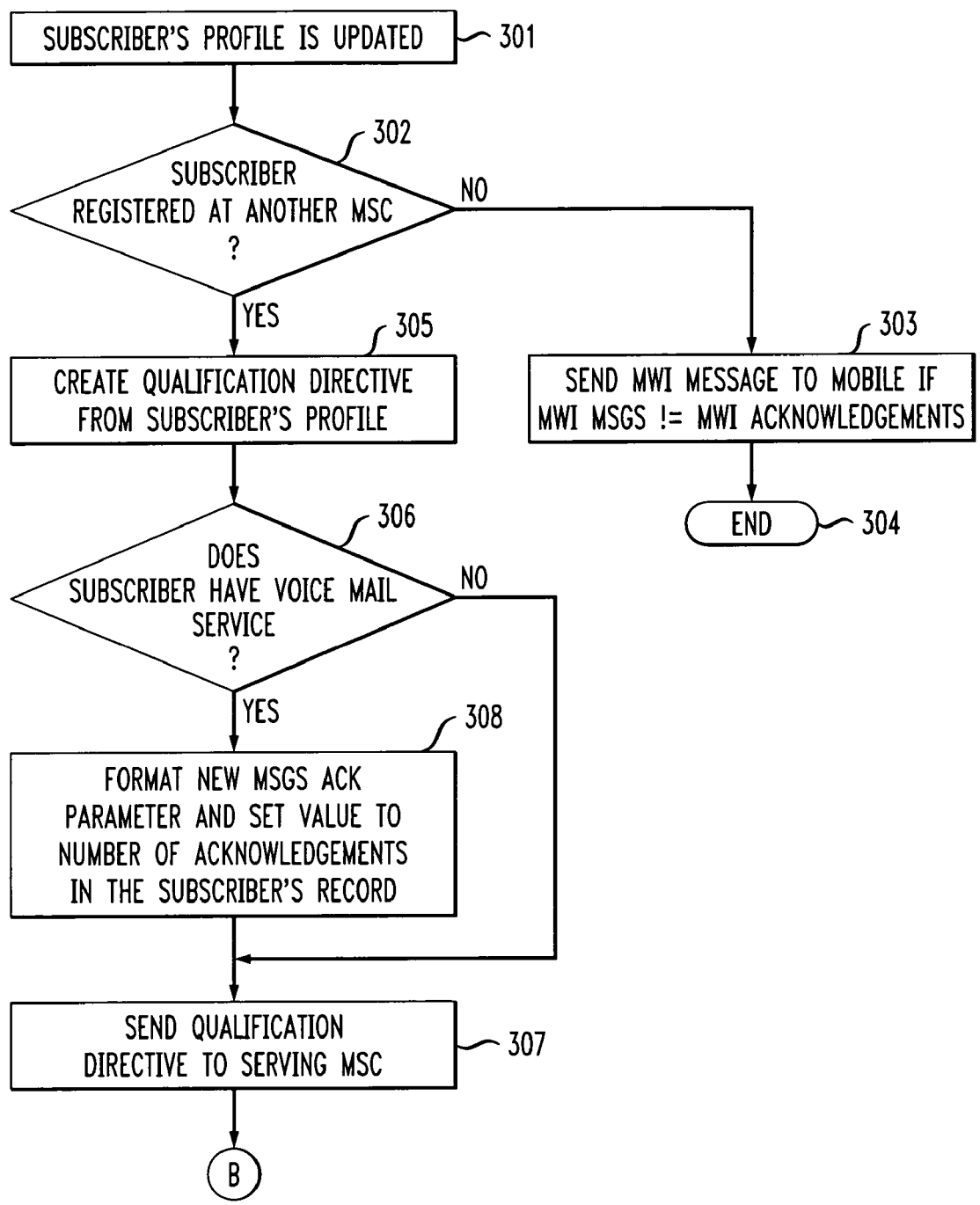
FIG. 3A and 3B illustrate in flow diagram form the operation of the message waiting notification update system to provide subscriber profile updates to the Visited Location Register in the serving Mobile Switching Center.
Figure 3B:
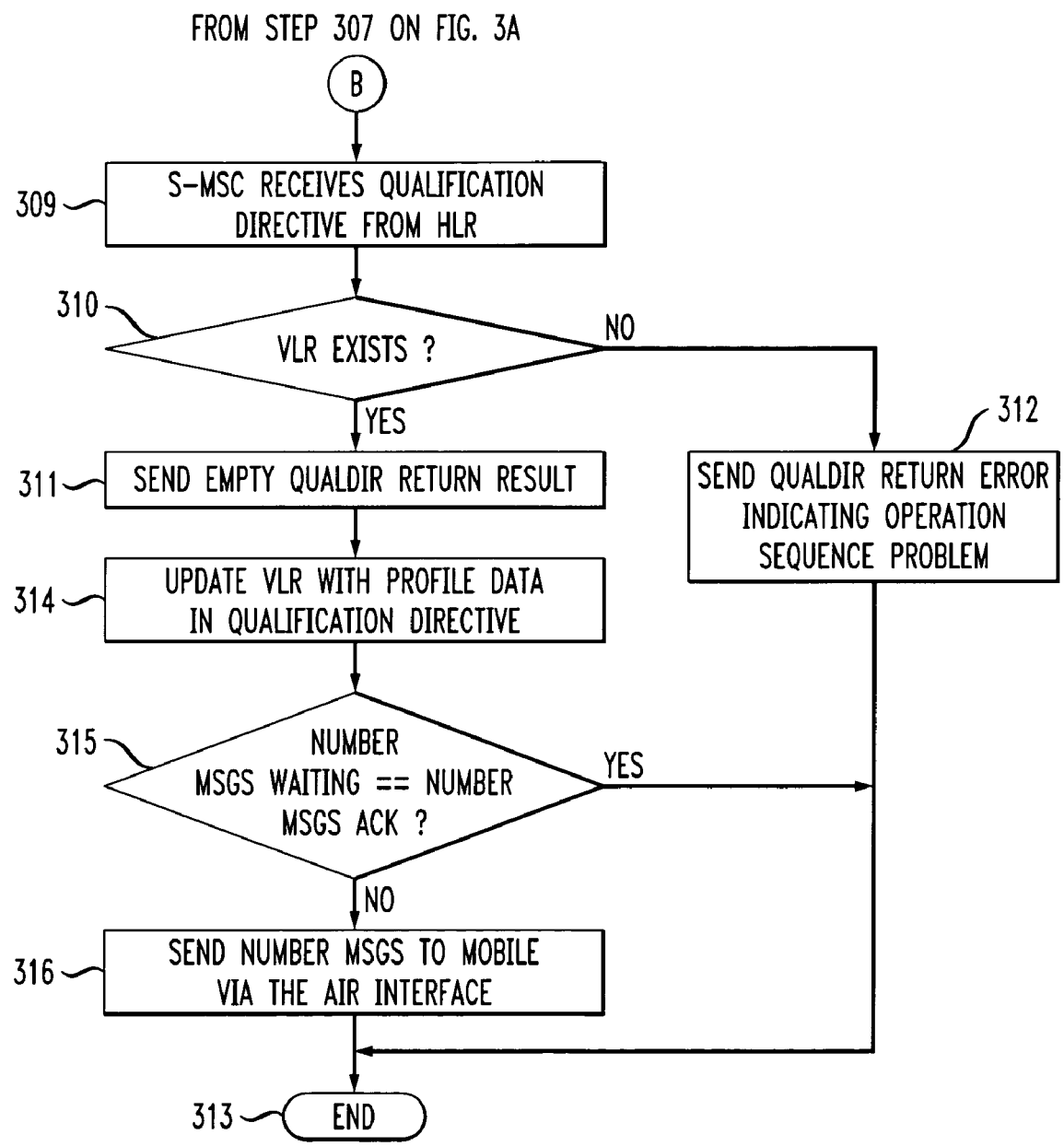

When the subscriber's Home Location Register 111 is updated and there is a serving Mobile Switching Center 102 that is providing service to the Mobile Subscriber Station 120, the updated data written into the subscriber's Home Location Register 111 is propagated to the Visited Location Register 112. FIG. 3 illustrates in flow diagram form the operation of the present message waiting notification update system to provide subscriber profile updates to the Visited Location Register in the serving Mobile Switching Center.

The process is initiated at step 301 when the subscriber's Home Location Register 111 updates a subscriber's profile. This could be either by a subscriber using a feature code to change a feature, personnel changes the subscriber's data, or an external entity, such as a voice mail system, initiates a change to the subscriber's data. At step 302, the subscriber's Home Location Register 111 determines whether the subscriber is registered at another Mobile Switching Center, for example, the serving Mobile Switching Center 102. If the subscriber is not registered at another Mobile Switching Center, at step 303, the subscriber's home Mobile Switching Center 101 reviews the message waiting information stored in subscriber's profile in the Home Location Register 111. If the number of unread messages and acknowledgements identified by the subscriber's Home Location Register 111 matches, processing ends at step 304. If the number of unread messages and acknowledgements identified by the subscriber's Home Location Register 111 fail to match, the subscriber's home Mobile Switching Center 101 transmits message waiting data to the Mobile Subscriber Station 120 using the forward control (paging) channel of the radio link as described above. The Mobile Subscriber Station 120 acknowledges receipt of the message received on the forward control channel and the presence of the unread message waiting information and processing exits at step 304.

If the subscriber is registered at another Mobile Switching Center, for example the serving Mobile Switching Center 102, then at step 305 the subscriber's home Mobile Switching Center 101 creates a Qualification Directive message from the data stored in the subscriber's profile in the subscriber's Home Location Register 111. At step 306, the subscriber's home Mobile Switching Center 101 determines whether the subscriber has voice mail service. If the subscriber does not have voice mail service, processing advances to step 307, as described below. If the subscriber does have voice mail service, at step 308 the Home Location Register 111 retrieves data from its memory indicative of the number of unread messages that are stored in memory for the subscriber and also formats a new MSGS ACK parameter and sets the value to the number of these unread messages that have been previously acknowledged by the Mobile Subscriber Station 120. For the purpose of this example, assume that new messages have arrived for the subscriber and no notification has previously been transmitted to the Mobile Subscriber Station 120 to alert the subscriber of the presence of these unread messages. Furthermore, at step 308 the Home Location Register 111 inserts this data into the previously generated Qualification Directive message and then at step 407 transmits this message to the serving Mobile Switching Center 102 indicative of the number of messages waiting for retrieval by the subscriber at the Mobile Subscriber Station 120. The serving Mobile Switching Center 102 receives the Qualification Directive message at step 309 and at step 310 determines whether there is a profile data entry for this subscriber. If there is no profile data entry for this subscriber, the serving Mobile Switching Center 102 at step 312 transmits a Qualification Directive Return Error message to the subscriber's Home Location Register 111 and processing in the serving Mobile Switching Center 102 exits at step 313. If there is profile data entry for this subscriber, the serving Mobile Switching Center 102 at step 311 transmits an empty Qualification Directive Return Result message to the subscriber's Home Location Register 111 and at step 314 updates the Visited Location Register 112 with the subscriber's profile data contained in the Qualification Directive message. At step 315, the serving Mobile Switching Center 102 compares the message waiting information contained in the Qualification Directive message with the message waiting data stored in the Visited Location Register 112 for this subscriber. Processing ends at step 313 if the number of unread messages and acknowledgements identified by the subscriber's Home Location Register 111 matches the data stored in the Visited Location Register 112 for the number of unread messages acknowledged by the Mobile Subscriber Station 120. If the serving Mobile Switching Center 102 determines the presence of unacknowledged unread messages, then at step 316 the serving Mobile Switching Center 102 uses the forward control (paging) channel of the radio link to the Mobile Subscriber Station 120 to transmit this message waiting data to the Mobile Subscriber Station 120. The Mobile Subscriber Station 120 acknowledges receipt of the message received on the forward control channel and the presence of the unread message waiting information. The processing of this transaction at the serving Mobile Switching Center 102 then exits at step 313.

Registration Cancellation

Figure 4A:
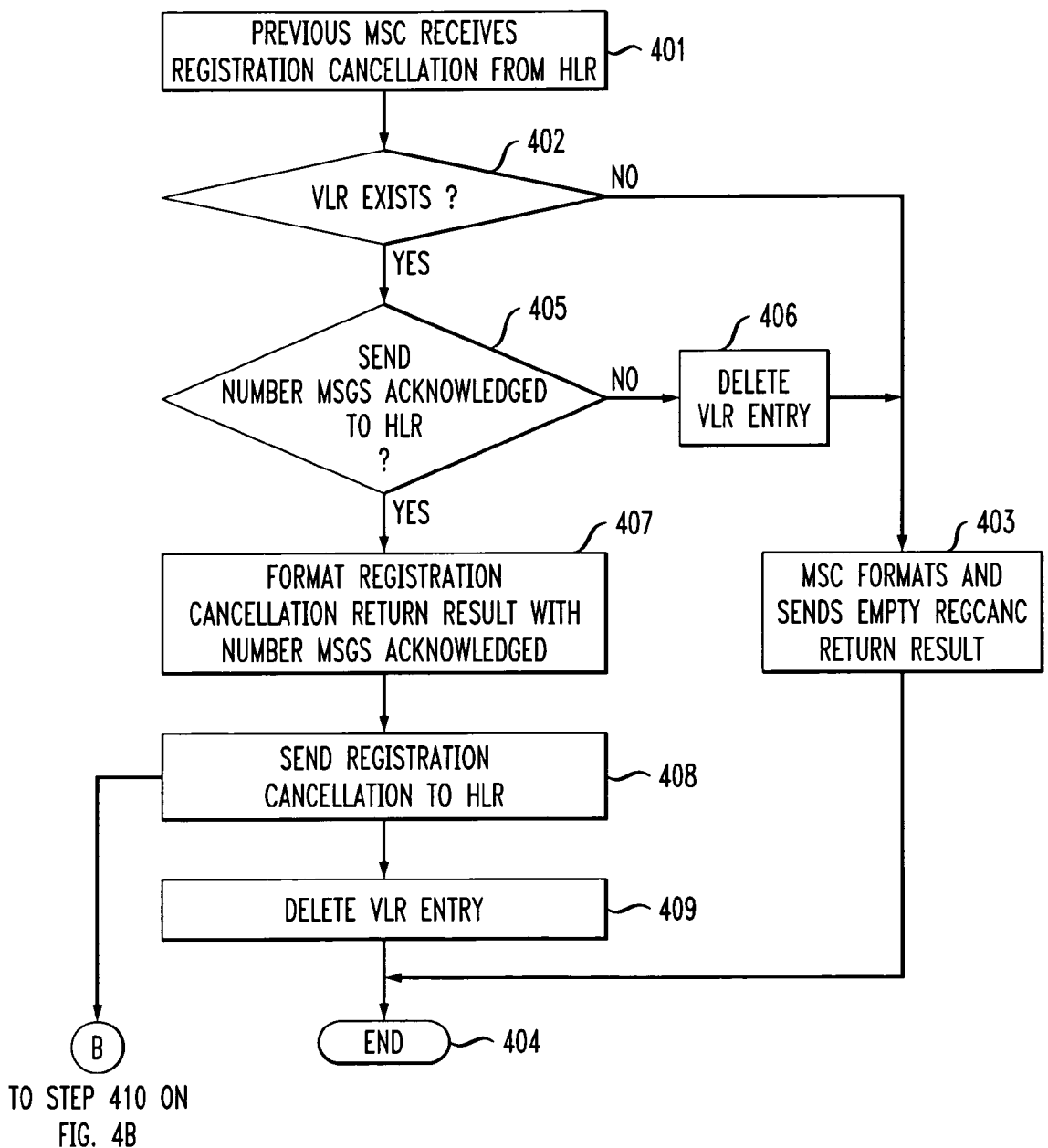
FIGS. 4A and 4B illustrate in flow diagram form the operation of the message waiting notification update system in response to a Registration Cancellation process.
Figure 4B:
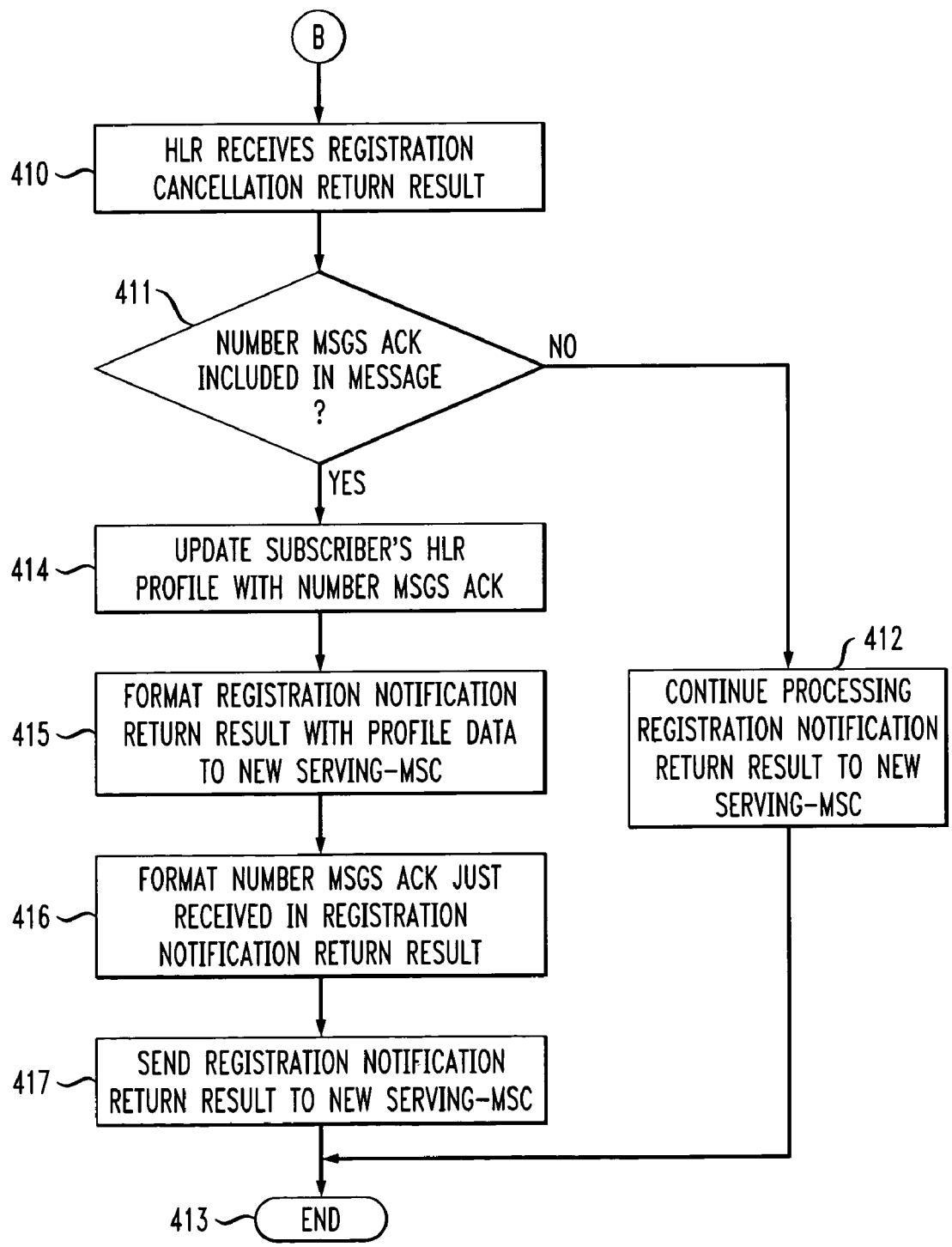

FIG. 4 illustrates in flow diagram form the operation of the present message waiting notification update system in response to a Registration Cancellation process. In the case where the Mobile Subscriber Station 120 roams from serving Mobile Switching Center 102 to a new Mobile Switching Center 103, as illustrated by the dotted line in FIG. 1, the Mobile Subscriber Station registration process is initiated at the new Mobile Switching Center 103 and this becomes the serving Mobile Switching Center 103. The registration process is implemented as described above.

To ensure that there is only one Mobile Switching Center that is presently active as the serving Mobile Switching Center, the subscriber's Home Location Register 111 cancels the subscriber's profile entry that was stored in the Visited Location Register 112 in the previous serving Mobile Switching Center 102. This process is initiated at step 401 when the subscriber's Home Location Register 111 transmits a Registration Cancellation message to the previous serving Mobile Switching Center 102, identifying the subscriber as now being active at a new serving Mobile Switching Center 103. At step 402, the previous serving Mobile Switching Center 102 determines whether there is a profile data entry for this subscriber. If there is no profile data entry for this subscriber, the previous serving Mobile Switching Center 102 at step 403 transmits an empty Registration Cancellation message to the subscriber's Home Location Register 111 and processing in the serving Mobile Switching Center 102 exits at step 404. If there is a profile data entry for this subscriber, the previous serving Mobile Switching Center 102 at step 405 determines whether there is a need to transmit updated data to the subscriber's Home Location Register (HLR) 111 relating to the number of unread messages acknowledged by the Mobile Subscriber Station 120. If not, at step 406 the previous serving Mobile Switching Center 102 deletes the profile data entry for this subscriber and processing in the serving Mobile Switching Center 102 exits at step 404. If there is a need to transmit updated data to the subscriber's Home Location Register (HLR) 111 relating to the number of unread messages acknowledged by the Mobile Subscriber Station 120, at step 407 the previous serving Mobile Switching Center 102 formats a Registration Cancellation Return Result message containing data indicative of the number of unread messages acknowledged by the Mobile Subscriber Station 120. The previous serving Mobile Switching Center 102 at step 408 transmits this message to the subscriber's Home Location Register 111 via the subscriber's home Mobile Switching Center 101, deletes the profile data entry for this subscriber at step 409, and processing in the serving Mobile Switching Center 102 exits at step 404.

The subscriber's Home Location Register 111 at step 410 receives the Registration Cancellation Return Result message and at step 411 determines whether the message contains data indicative of the number of unread messages acknowledged by the Mobile Subscriber Station 120. If not, processing advances to step 412 where the subscriber's Home Location Register 111 processes the Registration Notification Return Result message, as described above at step 207 and shown in FIG. 2. If the Registration Cancellation Return Result message contains data indicative of the number of unread messages acknowledged by the Mobile Subscriber Station 120, at step 414 the subscriber's profile data in the Home Location Register 111 is updated with the number of unread messages acknowledged by the Mobile Subscriber Station 120, and at step 415 the Home Location Register 111 formats a Registration Notification Return Result message with the subscriber's profile data stored in the Home Location Register 111 for this subscriber. At step 416 the Home Location Register 111 inserts data indicative of the number of acknowledgements identified by the previous serving Mobile Switching Center 102 into the previously generated Registration Notification Return Result message and transmits this message to the new serving Mobile Switching Center 103 at step 417. The processing at the Home Location Register 111 exits at step 413.

Message Waiting Indication System

Figure 5:
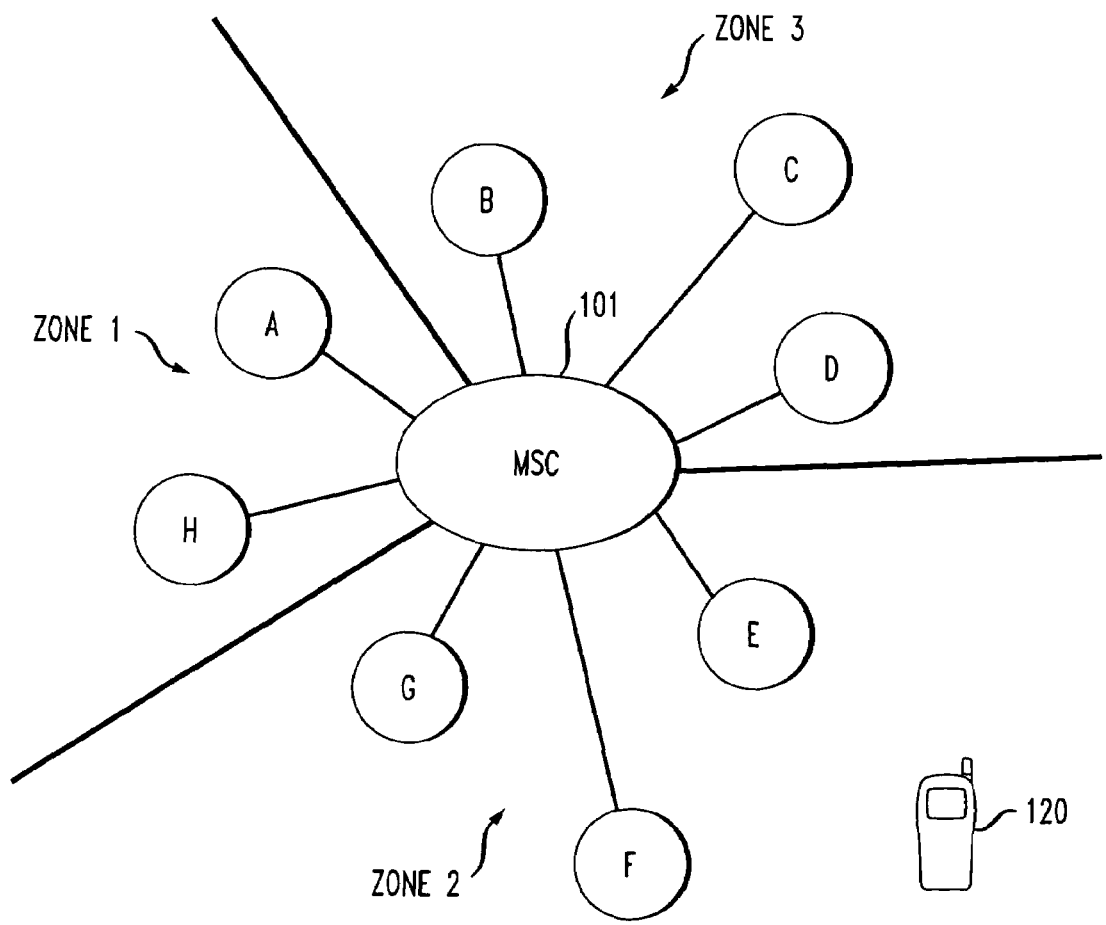
FIG. 5 illustrates a typical assignment of zones in a Mobile Switching Center for use in paging/registration and delivery of message waiting indication messages.
Figure 6A:
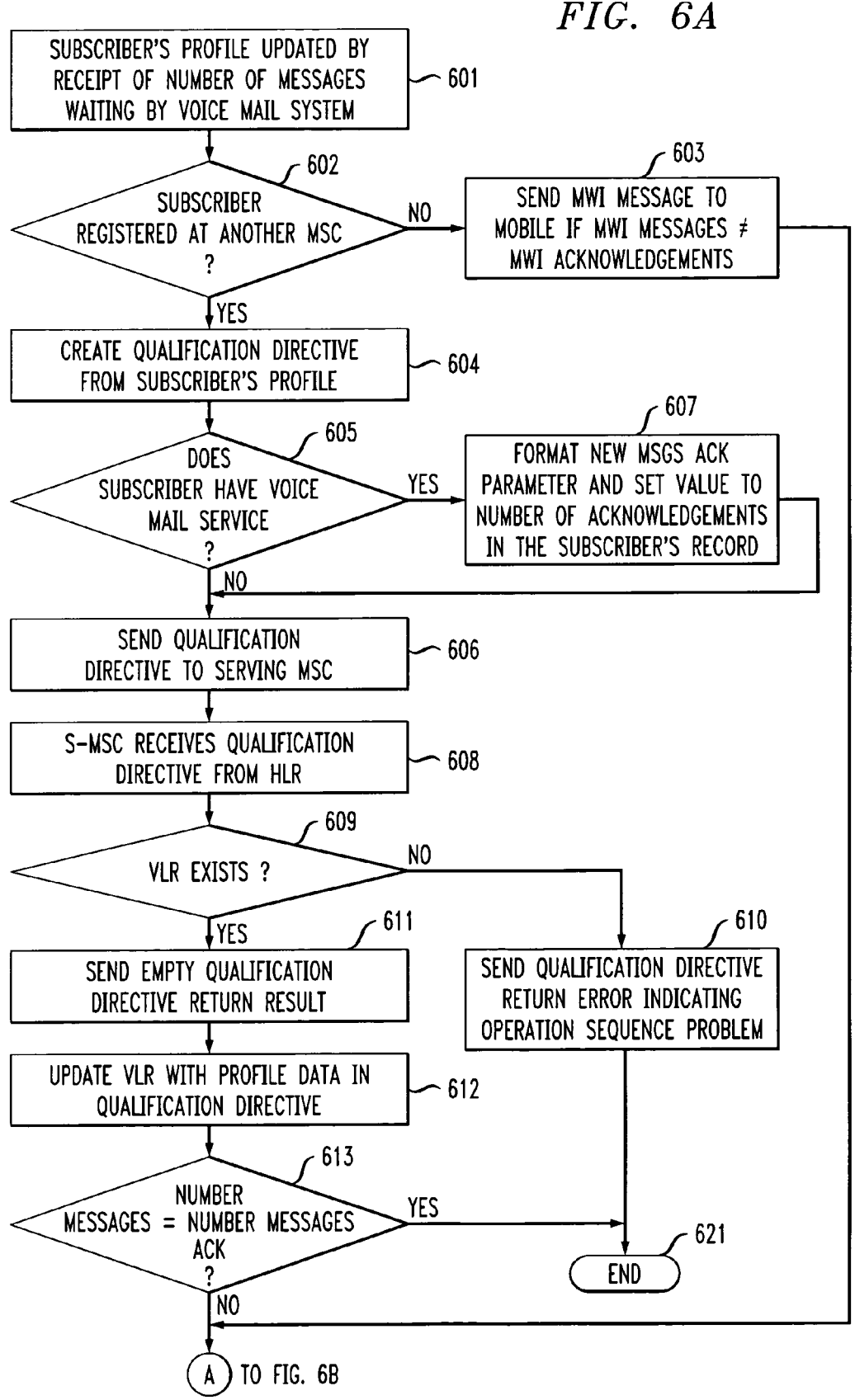
FIGS. 6A and 6B illustrate in flow diagram form the operation of the present message waiting indication system.
Figure 6B:
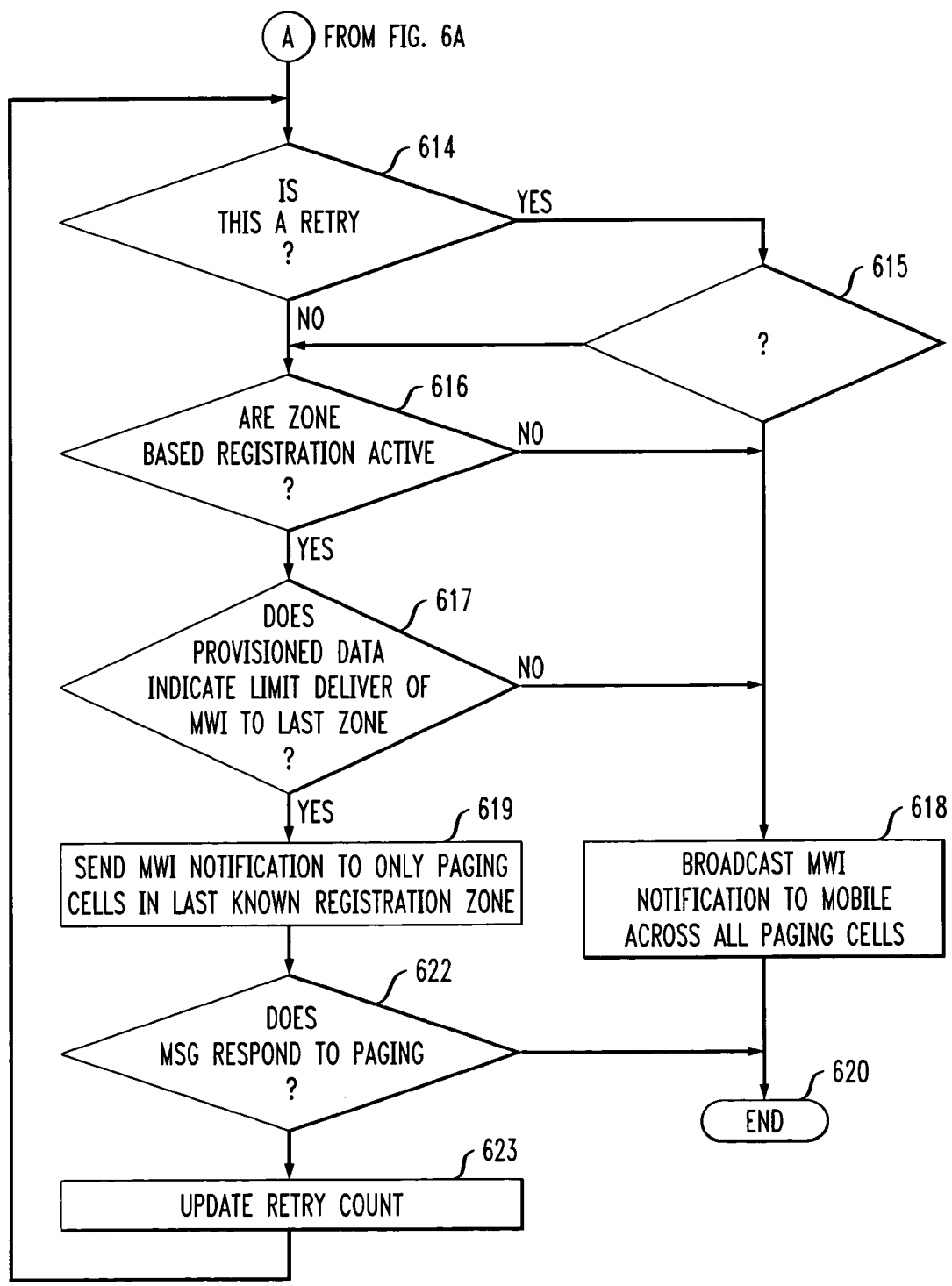

FIG. 5 illustrates a typical assignment of zones in a Mobile Switching Center for use in paging/registration and delivery of message waiting indication messages, and FIGS. 6A and 6B illustrate in flow diagram form the operation of the present message waiting indication system, which serves to reduce the traffic on the paging channel for message waiting indication messages.

As shown in FIG. 5, the Mobile Switching Center 101 serves a plurality of cell sites a-h, each of which has a call coverage area for serving a plurality of Mobile Subscriber Stations, such as Mobile Subscriber Station 120. As noted above, the Mobile Switching Center 101 is divided into a number of zones (Zones 1-3) for the purpose of segmenting the service area into a plurality of paging channel service areas. Each Zone includes one or more cell sites and the Mobile Switching Center 101 maintains data in its memory indicative of the zone configuration as well as the presence of Mobile Subscriber Stations in each of the cell sites as well as the corresponding paging zone.

The message waiting indication process illustrated in FIGS. 6A & 6B is implemented in Mobile Switching Center 101 and is initiated at step 601 when the Mobile Switching Center 101 receives a Number of Messages message from an associated Voice Mail System 130 (shown in FIG. 1), which indicates the present count of messages stored in the Voice Mail System 130 for a particular Mobile Subscriber Station 120. The Mobile Switching Center 101 updates the profile for the Mobile Subscriber Station 120 to reflect this new information and then at step 602 determines whether the Mobile Subscriber Station 120 is registered at the Mobile Switching Center 101 or another Mobile Switching Center 102 (or 103). If the Mobile Subscriber Station 120 is registered in Mobile Switching Center 101, then the Mobile Switching Center 101 at step 603 transmits a Message Waiting Indication message to Mobile Subscriber Station 120 if the present count of waiting messages does not equal the count of the acknowledgements received from the Mobile Subscriber Station 120. The processing exits if the two counts are equal; otherwise, processing advances to step 614 as described below.

If at step 602 it is determined that the Mobile Subscriber Station 120 is registered at another Mobile Switching Center, then processing advances to step 604 where the Mobile Switching Center 101 creates a Qualification Directive from the profile data stored for the Mobile Subscriber Station 120. At step 605 the Mobile Switching Center 101 determines whether the Mobile Subscriber Station 120 has voice mail service, and if not, processing advances to step 606. If the Mobile Subscriber Station 120 has voice mail service, processing advances to step 607 where a new MSGS ACK parameter is formatted and set to the value of the number of acknowledgements as noted in the profile for the Mobile Subscriber Station 120 as stored in the Home Location register 111. Processing then advances to step 606 where the Qualification Directive is transmitted to the serving Mobile Switching Center 102 which receives the message at step 608. At step 609 the serving Mobile Switching Center 102 determines whether there is a profile entry in the Visitor Location Register 112 for the Mobile Subscriber Station 120 and, if not, a Return Error message is generated at step 610 and transmitted to the Home Mobile Switching Center 101. Processing then exits at step 621. If a profile entry exists in the Visitor Location Register 112 for the Mobile Subscriber Station 120, then at step 611 the serving Mobile Switching Center 102 transmits an empty Qualification Directive return result to the Home Mobile Switching Center 101. At step 612 the serving Mobile Switching Center 102 updates the Visitor Location Register 112 for the Mobile Subscriber Station 120 with the profile data contained in the received Qualification Directive. At step 613 the serving Mobile Switching Center 102 determines if the present count of waiting messages does not equal the count of the acknowledgements received from the Mobile Subscriber Station 120. The processing exits at step 621 if the two counts are equal; otherwise, processing advances to step 614 as described below.

At step 614 the serving Mobile Switching Center 102 determines whether the present message waiting indication paging process is a newly initiated process or a retry process. The serving Mobile Switching Center 102 attempts to page the Mobile Subscriber Station 120 a predetermined number of times before terminating the message waiting indication process. If this is a retry process, at step 615 it is determined whether this is the last of the predetermined number of retries and, if so, at step 618 the Message Waiting Indication message is broadcast to all cells served by the serving Mobile Switching Center 102 and then processing exits at step 620. If the present message waiting indication paging process is a newly initiated process or not the last of the retry processes, then at step 616 it is determined whether a zone-based registration is active. If not, processing advances to step 618 where all cells are paged, as described above. If zone-based registration is active, then at step 617 it is determined whether the provisioned data indicates that only zone-based paging is to be tried and, if not, processing advances to step 618 where all cells are paged, as described above. If zone-based paging is to be tried, then at step 619, the serving Mobile Switching Center 102 delivers the message waiting indication message only to the cells that are located in the paging/registration zone in which the Mobile Subscriber Station 120 was last located. The paging zone can be implemented as either the paging/registration zone noted above, or can be a mapping table that maintains data indicative of the last cell in which the Mobile Subscriber Station 120 was active. In the latter case, the zone can constitute the last cell in which the Mobile Subscriber Station 120 was active, as well as a number of cells proximate to this cell or within a predetermined distance from this cell. There are numerous ways to manage the population of the zone list and these examples are simply illustrative of the concept. Processing then advances to step 622 where it is determined whether the Mobile Subscriber Station 120 responds to the message waiting indication notification and, if so, processing exits at step 620. If not, the count of paging retries is updated at step 623 and processing returns to step 614 as described above.

Summary

The message waiting notification update system is operable in the serving Mobile Switching Center to maintain an accurate count of the number of unread messages waiting for a subscriber and the number of unread messages acknowledged by the Mobile Subscriber Station. When the serving Mobile Switching Center receives a Registration Notification message return result from the subscriber's Home Location Register and the message waiting notification count is the same as the count previously sent to the Home Location Register, the serving Mobile Switching Center does not have to transmit a message waiting notification over the forward control channel to the Mobile Subscriber Station.

Likewise, when a Mobile Subscriber Station returns to the Home MSC service area, if the message waiting notification count is the same as the message waiting acknowledgement count in the HLR record, the Home MSC does not have to transmit the message waiting notification over the forward control (paging) channel to the Mobile Subscriber Station.

We claim:

1. A message waiting indication system, operable in a cellular communication network, for maintaining a count of the messages stored for a subscriber who uses a mobile subscriber station served by said cellular communication network, comprising:

voice mail means, located in said cellular communication network, for storing voice mail messages for subscribers served by said cellular communication network;

message waiting indication means, located in said cellular communication network, comprising:

subscriber profile means for storing, in a Home Location Register that serves said mobile subscriber station, data indicative of a present count of voice mail messages stored in said voice mail means for said subscriber's mobile subscriber station;

subscriber acknowledgement means for storing data, in said Home Location Register that serves said mobile subscriber station, indicative of a present count of acknowledged voice mail messages stored in said voice mail means for said subscriber's mobile subscriber station; and message notification means, responsive to the presence of voice mail messages not inclusive of those identified in said present count of acknowledged voice mail messages for said subscriber's mobile subscriber station, for transmitting data to said subscriber's mobile subscriber station indicative of said count, comprising:

location means for identifying a present predefined paging zone of a serving Mobile Switching Center in said cellular communication network in which said subscriber's mobile subscriber station was last located, paging means for activating paging of said subscriber's mobile subscriber station via a paging channel of said cellular communication network exclusively in all cells of said identified predefined paging zone of said cellular communication network, and Home Location Register update means, responsive to said subscriber's mobile subscriber station acknowledging receipt of said data to said subscriber's mobile subscriber station indicative of said count, for transmitting said acknowledgement to said subscriber's Home Location Register.

2. The message waiting indication system of claim 1 wherein said message notification means further comprises:

termination means, responsive to a failure to identify a present predefined paging zone of a serving Mobile Switching Center in which said subscriber's mobile subscriber station is located, for terminating paging of said subscriber's mobile subscriber station.

3. The message waiting indication system of claim 1 wherein said message notification means further comprises:

repetition means, responsive to identifying a present predefined paging zone of a serving Mobile Switching Center in which said subscriber's mobile subscriber station is located, for activating paging of said subscriber's mobile subscriber station in said predefined paging zone of a serving Mobile Switching Center up to a predetermined number of times until said subscriber's mobile subscriber station is located.

4. The message waiting indication system of claim 3 wherein said message notification means further comprises:
means, responsive to said paging of said subscriber's mobile subscriber station failing to reach said subscriber's mobile subscriber station in said predetermined number of times, for paging said subscriber's mobile subscriber station in all of said cells in said present serving Mobile Switching Center.

5. The message waiting indication system of claim 1 wherein said paging means comprises:
mapping means for identifying a last location where said subscriber's mobile subscriber station was located and at least one location within a predetermined distance from said last location.

6. The message waiting indication system of claim 5 wherein said aging means further comprises:
mapping means for identifying a last location where said subscriber's mobile subscriber station was located and at least one location from a look up table to identify locations within a predetermined distance from said last location.

7. The message waiting indication system of claim 5 wherein said message notification means further comprises:
repetition means, responsive to identifying said last location where said subscriber's mobile subscriber station was located and at least one location within a predetermined distance from said last location, for activating paging of said subscriber's mobile subscriber station in said last location where said subscriber's mobile subscriber station was located and at least one location within a predetermined distance from said last location until said subscriber's mobile subscriber station is located.

8. The message waiting indication system of claim 5 wherein said message notification means further comprises:
repetition means, responsive to identifying said last location where said subscriber's mobile subscriber station was located and at least one location within a predetermined distance from said last location, for activating paging of said subscriber's mobile subscriber station in said last location where said subscriber's mobile subscriber station was located until said subscriber's mobile subscriber station is located.

9. The message waiting indication system of claim 1 wherein said cellular communication network comprises at least one cell site, said location means comprises:
location data update means, responsive to location data received from said cellular communication network, for recording present location data identifying one of said at least one cell site which presently serves said subscriber's mobile subscriber station.

10. A method of operating a message waiting indication system, located in a cellular communication network, for maintaining a count of the messages stored for a subscriber who uses a mobile subscriber station served by said cellular communication network, comprising:
storing, in a Home Location Register that serves said mobile subscriber station, voice mail messages in a voice mail system, located in said cellular communication network, for subscribers served by said cellular communication network;
storing, in a Home Location Register that serves said mobile subscriber station, data indicative of a present count of voice mail messages stored in said voice mail system for said subscriber's mobile subscriber station;
storing data indicative of a present count of acknowledged voice mail messages stored in said voice mail system for said subscriber's mobile subscriber station; and
transmitting, in response to the presence of voice mail messages not inclusive of those identified in said present count of acknowledged voice mail messages for said subscriber's mobile subscriber station, data to said subscriber's mobile subscriber station indicative of said count, comprising:
identifying a present predefined paging zone of a serving Mobile Switching Center in said cellular communication network in which said subscriber's mobile subscriber station was last located,
activating paging of said subscriber's mobile subscriber station via a paging channel of said cellular communication network exclusively in all cells of said identified predefined paging zone of said cellular communication network, and
transmitting, in response to said subscriber's mobile subscriber station acknowledging receipt of said data to said subscriber's mobile subscriber station indicative of said count, said acknowledgement to said subscriber's Home Location Register.

11. The method of operating a message waiting indication system of claim 10 wherein said step of transmitting further comprises:
terminating, in response to a failure to identify a present predefined paging zone of a serving Mobile Switching Center in which said subscriber's mobile subscriber station is located, for terminating paging of said subscriber's mobile subscriber station.

12. The method of operating a message waiting indication system of claim 10 wherein said step of transmitting further comprises:
activating, in response to identifying a present predefined paging zone of a serving Mobile Switching Center in which said subscriber's mobile subscriber station is located, paging of said subscriber's mobile subscriber station in said predefined paging zone of a serving Mobile Switching Center up to a predetermined number of times until said subscriber's mobile subscriber station is located.

13. The method of operating a message waiting indication system of claim 12 wherein said step of transmitting further comprises:
paging, in response to said paging of said subscriber's mobile subscriber station failing to reach said subscriber's mobile subscriber station in said predetermined number of times, said subscriber's mobile subscriber station in all of said cells in said present serving Mobile Switching Center.

14. The method of operating a message waiting indication system of claim 10 wherein said step of paging comprises:
identifying a last location where said subscriber's mobile subscriber station was located and at least one location within a predetermined distance from said last location.

15. The method of operating a message waiting indication system of claim 14 wherein said step of paging further comprises:
identifying a last location where said subscriber's mobile subscriber station was located and at least one location from a look-up table to identify locations within a predetermined distance from said last location.

16. The method of operating a message waiting indication system of claim 14 wherein said step of transmitting further comprises:

activating, in response to identifying said last location where said subscriber's mobile subscriber station was located and at least one location within a predetermined distance from said last location, paging of said subscriber's mobile subscriber station in said last location where said subscriber's mobile subscriber station was located and at least one location within a predetermined distance from said last location until said subscriber's mobile subscriber station is located.

17. The method of operating a message waiting indication system of claim 14 wherein said step of transmitting further comprises:

activating, in response to identifying said last location where said subscriber's mobile subscriber station was located and at least one location within a predetermined distance from said last location, paging of said subscriber's mobile subscriber station in said last location where said subscriber's mobile subscriber station was located until said subscriber's mobile subscriber station is located.

18. The method of operating a message waiting indication system of claim 10 wherein said cellular communication network comprises at least one cell site, said step of identifying comprises:

recording, in response to location data received from said cellular communication network, present location data identifying a one of said at least one cell site which presently serves said subscriber's mobile subscriber station.

* * * * *